United States Patent [19]
Malofsky

[11] 3,988,299
[45] Oct. 26, 1976

[54] ANAEROBIC ADHESIVE COMPOSITION HAVING IMPROVED STRENGTH AT ELEVATED TEMPERATURE CONSISTING OF UNSATURATED DIACRYLATE MONOMER AND MALEIMIDE ADDITIVE

[75] Inventor: Bernard M. Malofsky, Bloomfield, Conn.

[73] Assignee: Loctite Corporation, Newington, Conn.

[22] Filed: Sept. 22, 1975

[21] Appl. No.: 615,666

Related U.S. Application Data

[63] Continuation-in-part of Ser. No. 513,609, Oct. 10, 1974, abandoned.

[52] U.S. Cl. .................. 260/47 UA; 156/332; 260/47 CZ; 260/45.8 N; 526/203; 526/258
[51] Int. Cl.² .......................................... C09J 5/00
[58] Field of Search ......... 260/47 UA, 47 CZ, 47 R, 260/204, 258, 45.8 N; 156/332

[56] References Cited
UNITED STATES PATENTS

| | | | |
|---|---|---|---|
| 3,616,040 | 10/1971 | Tobach | 156/332 |
| 3,740,850 | 6/1973 | Bower et al. | 526/204 |
| 3,855,180 | 12/1974 | Schroeter | 260/47 UA |
| 3,890,273 | 6/1975 | Saito | 260/47 UA |
| 3,944,521 | 3/1976 | Bradley | 156/331 |

*Primary Examiner*—Donald Levy
*Assistant Examiner*—Peter F. Kulkosky
*Attorney, Agent, or Firm*—Jean B. Mauro

[57] ABSTRACT

A curable composition based on bisphenol-A derivatives or compositions corresponding to the formula

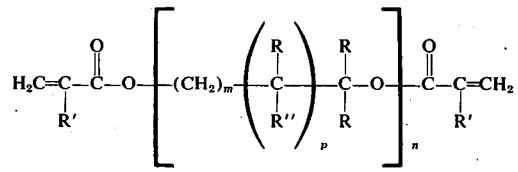

("R" groups as defined herein) in combination with a free radical initiator and a bismaleimide- or nadic-type additive. These compositions have improved strength properties at elevated temperatures and improved resistance to thermal degradation.

Also disclosed is a process for sealing or adhering surfaces by use of these compositions.

12 Claims, No Drawings

ANAEROBIC ADHESIVE COMPOSITION HAVING IMPROVED STRENGTH AT ELEVATED TEMPERATURE CONSISTING OF UNSATURATED DIACRYLATE MONOMER AND MALEIMIDE ADDITIVE

CROSS-REFERENCE TO RELATED APPLICATION

This application is a continuation-in-part of application Ser. No. 513,609, filed Oct. 10, 1974.

BACKGROUND OF THE INVENTION

1. Field of the Invention

This invention relates to certain adhesive and sealant compositions having improved strength properties at elevated temperatures and improved resistance to thermal degradation.

2. Prior Art

Adhesive and sealant compositions based on acrylate and methacrylate monomers polymerizable by free-radical initiation are known in the art. Likewise, anaerobic compositions are known in the art (see, for example U.S. Pat. Nos. 2,895,950, 3,043,820, and 3,218,305). Anaerobic compositions are characterized by their ability to remain liquid in the presence of air, but cure to a strong adhesive bond when air is excluded, as by assembling a mated nut and bolt to which the composition has been applied.

While serving many useful purposes, both standard acrylate compositions as well as anaerobic-type acrylate compositions have been limited in applicability due to degradation of adhesive strength at elevated temperatures, e.g., 250° F or more.

SUMMARY OF THE INVENTION

According to the present invention there is provided an adhesive and sealant composition having significantly improved strength at elevated temperatures and improved resistance to thermal degradation. This composition comprises a mixture of a. a monomer selected from the group consisting of ethoxylated bisphenol A diacrylate, ethoxylated bisphenol A dimethacrylate, and an acrylate ester corresponding to the formula

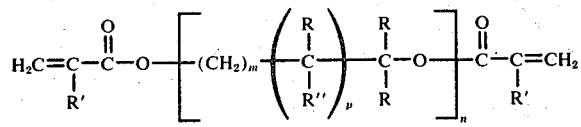

wherein R represents a radical selected from the group consisting of hydrogen, lower alkyl of 1–4 carbon atoms, inclusive, hydroxy alkyl of 1–4 carbon atoms inclusive, and

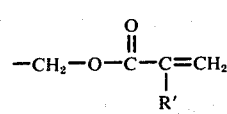

R' is a radical selected from the group consisting of hydrogen, halogen, and lower alkyl of 1–4 carbon atoms; R'' is a radical selected from the group consisting of hydrogen, —OH and

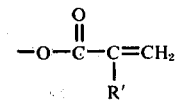

$m$ is an integer equal to at least 1, e.g., from 1 to 8 or higher, for instance, from 1 to about 4 inclusive; $n$ is an integer equal to at least 1, for example, 1 to 20 or more; and $p$ is 0 or 1;

b. an additive selected from the group consisting of

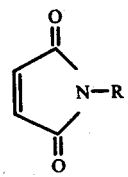 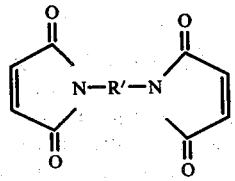

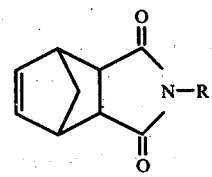

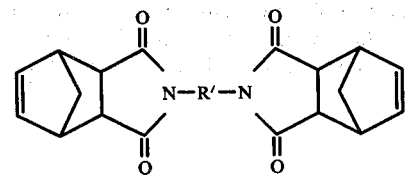

wherein R and R' are selected from the group consisting of alkyl, cycloalkyl, aralkyl, alkaryl.

The invention further relates to a process for sealing or adhering surfaces comprising applying a composition of this invention to surfaces to be sealed or adhered, placing the surfaces in abutting relationship and allowing the composition to cure.

DETAILED DESCRIPTION OF THE INVENTION

One class of monomers suited for use in this invention comprises acrylate esters having the following general formula:

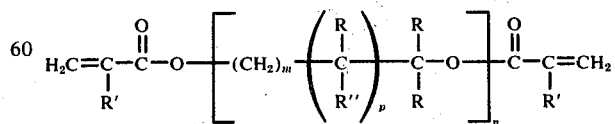

wherein R represents a radical selected from the group consisting of hydrogen, lower alkyl of 1–4 carbon atoms, inclusive, hydroxy alkyl of 1–4 carbon atoms inclusive, and

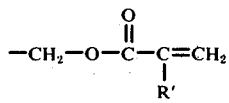

R' is a radical selected from the group consisting of hydrogen, halogen, and lower alkyl of 1–4 carbon atoms; R'' is a radical selected from the group consisting of hydrogen, —OH and

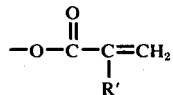

$m$ is an integer equal to at least 1, e.g., from 1 to 8 or higher, for instance, from 1 to 4 inclusive; $n$ is an integer equal to at least 1, for example, 1 to 20 or more; and $p$ is one of the following: 0,1.

The polymerizable polyacrylate esters utilized in accordance with the invention and corresponding to the above general formula are exemplified by, but not restricted to, the following materials: diethylene glycol dimethacrylate, triethylene glycol dimethacrylate, tetraethylene glycol dimethacrylate, dipropylene glycol dimethacrylate, di-(pentamethylene glycol) dimethacrylate, tetraethylene diglycerol diacrylate, diglycerol tetramethacrylate, tetramethylene dimethacrylate, ethylene dimethacrylate, neopentyl glycol diacrylate and trimethylol propane triacrylate. Of these, the preferred monomers are triethylene glycol dimethacrylate and polyethylene glycol dimethacrylate.

The most preferred class of monomers for use in this invention, however, is ethoxylated bisphenol A dimethacrylate, which has the following structural formula:

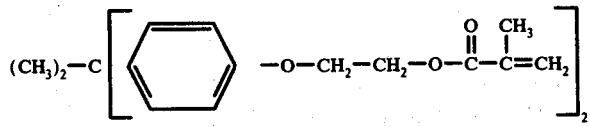

The other critical component of the composition is an additive which conforms to any of the following structures:

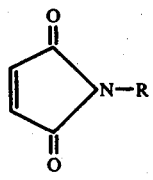

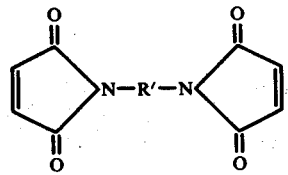

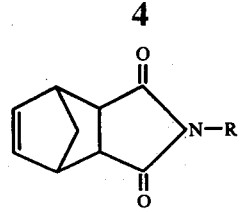

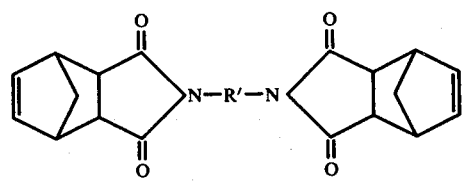

The nature of R and R' is not critical for purposes of this invention and may be any organic radical which does not contain any group which will adversely affect the composition for purposes disclosed herein. Most commonly, R and R' are selected from the group consisting of alkyl, cycloalkyl, aralkyl, alkaryl, any of which may be exceptionally large radicals, e.g., containing up to about 200 carbon atoms or more; preferably they will contain from 6 to about 100 carbon atoms, most preferably, 6 to about 50 carbon atoms.

It has been found that resistance to thermal oxidative degradation is improved if R or R' are aromatic; however, this is not required for the general improvement of this invention to be realized. It will, of course, be understood that both R and R' can consist of relatively complicated moieties, provided only that they do not contain functionality which interferes with the performance of the additive for its intended purposes. The useful concentration range for this additive is about 1 to about 50, preferably about 5 to about 35, percent by weight of the total composition.

In general, these compositions are readily curable by application of moderate heat.

The compositions may also be rendered anaerobic and curable at room temperature by inclusion of a peroxy initiator of free-radical polymerization, which is a preferred embodiment of this invention. A number of such initiators are well known in the anaerobic art, e.g., hydroperoxides, such as cumene hydroperoxide, paramenthane hydroperoxide, tertirary butyl hydroperoxide, and peresters which hydrolyze to peroxides such as tertiary butyl perbenzoate, and the like. The amount of such peroxy compounds may vary from about 0.1 to about 10, preferably about 1 to about 5, percent by weight of the total composition.

Accelerators of anaerobic polymerization may also be advantageously included. Such accelerators include a variety of secondary and tertiary organic amines as well as sulfimides (e.g., benzoic sulfimide) which are also known in the art. These may be used at a concentration range of about 0.1 to about 5, preferably about 1 to about 2, percent by weight of the total composition.

Other agents such as thickeners, plasticizers, etc., are also known in the art and may advantageously be incorporated where functionally desirable, provided only that they do not interfere with the functioning of the additive for its intended purpose. This, of course, can be determined by simple experimentation.

The additives of this invention tend to improve at least three properties of the cured composition, the extent and nature of the improvement appearing to depend on the specific monomer involved. These improvements comprise greater resistance to degradation of an adhesive bond caused by oxidative effects incurred at elevated temperatures, greater strength of the bond or seal at elevated temperatures, and often also an improvement of the cure strength obtained under room temperature curing conditions. The precise nature of the improvement mechanism is not well understood. Without wishing to be bound by any particular theory, it appears that the additives of this invention tend to copolymerize with the monomers, thereby tending to terminate the molecular "unzipping" effect which appears to characterize thermal degradation. The improvement of hot strength is believed due to the increase in glass transition temperature brought about by such copolymerization.

The following examples illustrate but in no way limit the invention. Percentages are by weight based on the total composition.

EXAMPLE I

Anaerobic compositions were prepared by mixing into bisphenol A dimethacrylate the following materials:

5% bisphenol A fumarate (suspending agent)
3% cumene hydroperoxide
1.5% benzoic sulfimide
1% diethyl paratoluidene
0.5% dimethyl orthotoluidene
25% additive of this invention as shown in the Table I.

These compositions were applied to steel pins and collars, which were then assembled and allowed to cure for 24 hours at room temperature until bond strength had fully developed. The samples were then aged at 450° F for the periods shown in Table I. They were then allowed to cool to room temperature and the pins were pressed from the collars using an Instron tester. Table I reports the results in pounds per square inch of shear strength and shows the desirable improvement in thermal aging strength retention.

TABLE 1

| Weeks at 450° F | 1 | 2 | 4 | 8 | 11 | 15 | 26 |
|---|---|---|---|---|---|---|---|
| N-phenylmaleimide | 3900 | 3350 | 2000 | 1200 | — | — | 0 |
| m-phenylene di-maleimide | 4300 | 5000 | 5000 | 5000 | 5000 | — | 0 |
| "Kerimide 601"* | 4500 | 4600 | 4700 | 4300 | 4300 | 2200 | 700 |
| Control-no additive | 3500 | 1100 | 0 | | | | |

*Sold by Rhodia Corp., New York, N.Y. A reaction product of a bismalcimide with a diamine.

EXAMPLE II

Formulations were prepared similar to those of Example I except that only Keramid 601 was employed as the additive and the monomer was polyethylene glycol dimethacrylate, having a molecular weight of about 330. The formulations in Table II were used to adhere ¼-20 steel nuts and bolts together. The samples were aged at 400° F for the times shown, but were tested at room temperature, as before. Table II shows "break/prevail" strength in footpounds. "Break" strength is the torque required to cause the first movement between nut and bolt. "Prevail" strength is the torque required to unwind the nut 180° beyond the break point.

TABLE II

| Time at 400° F | One Day | One Week | Two Weeks |
|---|---|---|---|
| 10% additive | 142/400 | 93/340 | 33/145 |
| 30% additive | 172/390 | 178/465 | 165/445 |
| Control-no additive | 48/330 | 7/18 | 0/2 |

EXAMPLE III

A sample corresponding to the 30% additive level in Table II was tested after two weeks' aging at 400° F. The test was performed at 400° with the following break/prevail results: 180/235.

Example II again illustrates the improved resistance to thermal degradation and Example III illustrates the improved strength at high temperature which characterize the formulations of this invention.

What is claimed is:

1. A composition curable by heat and having improved thermal properties comprising a mixture of
   a. a monomer selected from the group consisting of ethoxylated bisphenol-A diacrylate, ethoxylated bisphenol-A dimethacrylate, and an acrylate ester corresponding to the formula

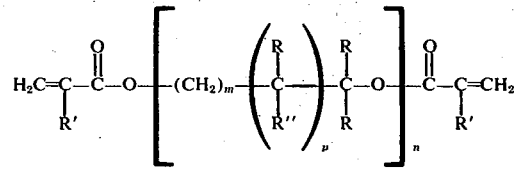

wherein R represents a radical selected from the group consisting of hydrogen, lower alkyl of 1–4 carbon atoms, inclusive, hydroxy alkyl of 1–4 carbon atoms inclusive, and

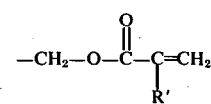

R' is a radical selected from the group consisting of hydrogen, halogen, and lower alkyl of 1–4 carbon atoms; R'' is a radical selected from the group consisting of hydrogen, —OH and

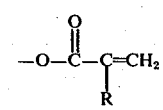

m is an integer equal to at least 1; n is an integer equal to at least 1; and p is 0 or 1;
   b. about 1 to about 5 percent by weight of the total composition of an additive selected from the group consisting of

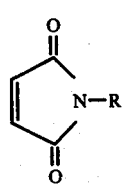 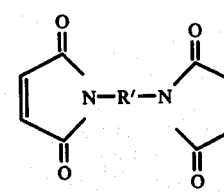

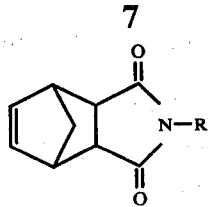

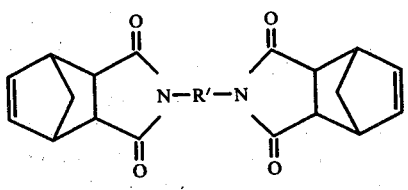

wherein R and R' are selected from the group consisting of alkyl, cycloalkyl, aralkyl, alkaryl.

2. The composition of claim 1 wherein the monomer is ethoxylated bisphenol A.

3. The composition of claim 1 wherein the monomer is polyethylene glycol dimethacrylate.

4. The composition of claim 1 wherein the additive is

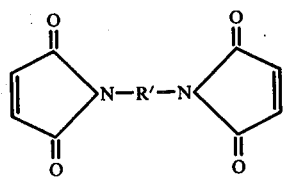

5. A curable anaerobic adhesive sealant composition comprising a mixture of
  a. a monomer selected from the group consisting of ethoxylated bisphenol-A diacrylate, ethoxylated bisphenol-A dimethacrylate, and an acrylate ester corresponding to the formula

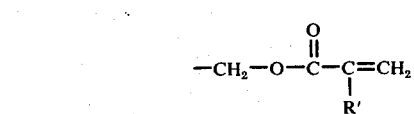

wherein R represents a radical selected from the group consisting of hydrogen, lower alkyl of 1–4 carbon atoms, inclusive, hydroxy alkyl of 1–4 carbon atoms inclusive, and $$-CH_2-O-\overset{O}{\underset{}{\overset{\|}{C}}}-\underset{R'}{C}=CH_2$$

R' is a radical selected from the group consisting of hydrogen, halogen and lower alkyl of 1–4 carbon atoms; R'' is a radical selected from the group consisting of hydrogen, —OH, and

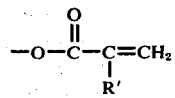

$m$ is an integer equal to at least 1; $n$ is an integer equal to at least 1; and $p$ is 0 or 1;
  b. about 1 to about 50 percent by weight of the total composition of an additive selected from the group consisting of

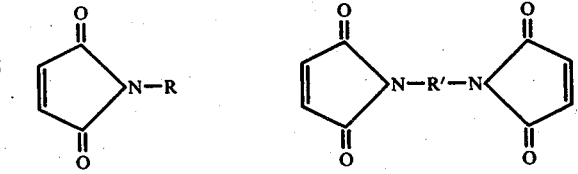

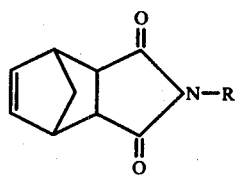

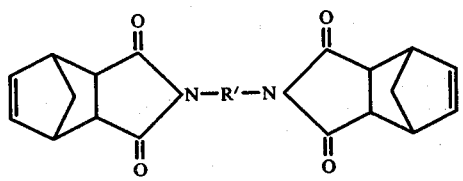

wherein R and R' are selected from the group consisting of alkyl, cycloalkyl, aralkyl, alkaryl; and
  c. about 0.1 to about 10 percent by weight of the total composition of a peroxy initiator of free-radical polymerization, said composition being curable at room temperature upon substantial exclusion of oxygen.

6. The composition of claim 5 wherein the monomer is ethoxylated bisphenol A dimethacrylate.

7. The composition of claim 5 wherein the monomer is polyethylene glycol dimethacrylate.

8. The composition of claim 5 wherein the additive is

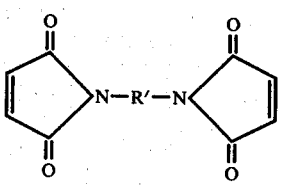

9. The composition of claim 5 wherein the initiator is cumene hydroperoxide.

10. The composition of claim 5 which additionally contains about 0.1 to about 5 percent by weight of the total composition of an accelerator of anaerobic polymerization.

11. A process for providing between close-fitting, abutting surfaces, a seal having improved thermal properties comprising applying the composition of claim 1 to either of such surfaces, placing the surfaces in abutting relationship and allowing the composition to cure by application of moderate heat.

12. A process for providing between close-fitting, abutting surfaces, a seal having improved thermal properties comprising applying the composition of claim 6 to either of such surfaces, placing the surfaces in abutting relationship and allowing the composition to cure.

* * * * *